(12) United States Patent
Zhao et al.

(10) Patent No.: US 8,607,001 B2
(45) Date of Patent: Dec. 10, 2013

(54) METHOD, APPARATUS, PROXY SERVER, AND SYSTEM FOR SELECTING CACHE REPLACEMENT POLICIES

(75) Inventors: Yuping Zhao, Shenzhen (CN); Hanyu Wei, Shenzhen (CN); Hao Wang, Shenzhen (CN); Jian Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/208,085

(22) Filed: Aug. 11, 2011

(65) Prior Publication Data

US 2012/0079206 A1 Mar. 29, 2012

(30) Foreign Application Priority Data

Sep. 26, 2010 (CN) .......................... 2010 1 0295033

(51) Int. Cl.
*G06F 12/12* (2006.01)
(52) U.S. Cl.
USPC .......................................... 711/134; 711/133
(58) Field of Classification Search
None
See application file for complete search history.

(56) References Cited

U.S. PATENT DOCUMENTS

| 6,272,598 | B1 * | 8/2001 | Arlitt et al. ..................... 711/133 |
| 6,834,329 | B2 * | 12/2004 | Sasaki et al. ................... 711/134 |
| 6,986,018 | B2 * | 1/2006 | O'Rourke et al. ............ 711/213 |
| 8,392,658 | B2 * | 3/2013 | Wang et al. .................... 711/128 |
| 2002/0147895 | A1 * | 10/2002 | Glance et al. ................. 711/158 |
| 2009/0100228 | A1 * | 4/2009 | Lepeska et al. ............... 711/125 |
| 2010/0299553 | A1 | 11/2010 | Cen |

FOREIGN PATENT DOCUMENTS

| CN | 101236530 A | 8/2008 |
| CN | 101562543 A | 10/2009 |

OTHER PUBLICATIONS

José Aguilar and Ernst Leiss: "A Cache Memory System based on a Dynamic/ Adaptive Replacement Approach," total 14 pages.
José Aguilar and Ernst Leiss: "An Adaptive Coherence-Replacement Protocol for Web Proxy Cache Systems," Computer Systems, vol. 8 No. 1, pp. 001-014, total 14 pages.
Office Action issued in corresponding Chinese Patent Application No. 201010295033.5, mailed Aug. 28, 2012.
Office Action issued in corresponding Chinese Patent Application No. 201010295033.5, mailed Mar. 13, 2013.
Office Action issued in corresponding Chinese Patent Application No. 201010295033.5, mailed Aug. 8, 2013, 16 pages.

* cited by examiner

*Primary Examiner* — Gary Portka
(74) *Attorney, Agent, or Firm* — Brinks Gilson & Lione

(57) ABSTRACT

Embodiments of the present invention provide a method, an apparatus, and a proxy server for selecting cache replacement policies to reduce manual participation and switch cache replacement policies automatically. The method includes: obtaining statistical data of multiple cache replacement policies that are running simultaneously; and switching, according to an event of policy decision for cache replacement policies and the statistical data, an active cache replacement policy to a cache replacement policy that complies with a policy decision requirement. The automatic switching of cache replacement policies lowers the technical requirements on administrators. In addition, in the operation process of a proxy cache, a cache replacement policy that is applicable to a current scenario and meets a performance expectation of a user can be selected automatically, so as to make the technical solution feature good adaptability. Compared with the existing solution in which only a cache replacement policy is used throughout, the technical solution of the present invention can improve the performance of the proxy cache.

8 Claims, 2 Drawing Sheets

METHOD, APPARATUS, PROXY SERVER, AND SYSTEM FOR SELECTING CACHE REPLACEMENT POLICIES

CROSS-REFERENCE TO RELATED APPLICATIONS

This application claims priority to Chinese Patent Application No. 201010295033.5, filed on Sep. 26, 2010, which is hereby incorporated by reference in its entirety.

FIELD OF THE INVENTION

The present invention relates to the communication field, and in particular, to a method, an apparatus, a proxy server, and a system for selecting cache replacement policies.

BACKGROUND OF THE INVENTION

With the fast development of the Internet, more and more people obtain rich information resources through the Internet. However, the sharp increase of users inevitably causes problems such as heavy load on the network server, longer latency on the client, and congestion of the backbone network. In particular, with the popularity of streaming applications on the Internet such as video on demand (VOD), long distance education, and e-commerce, these problems become more serious.

The conventional method for solving these problems is to upgrade the network server and increase the network access bandwidth continuously. However, this conventional method cannot solve the problems fundamentally. The reason is as follows: The upgrade speed of the server is generally slower than the increase speed of the number of users; merely increasing the network access bandwidth cannot solve the congestion of the backbone network, and the upgrade of the backbone network costs a lot.

The proxy cache technology can effectively solve the above problems faced by the conventional method. The proxy cache, also known as a proxy server, is a server between the browser and the server or a server between the client and the server, and can provide a large storage space. When a user accesses data, it is checked whether data needed by the user is available in the proxy cache. If the data is available in the proxy cache, the data is directly sent to the user; otherwise, the data is obtained from the server and sent to the user.

The access mechanism of the proxy cache may reduce the count of attempts to access the remote server by the user, increases the response speed of the client directly, and eases the load on the remote server and the congestion of the backbone network indirectly. In addition, because the proxy cache stores a data copy, the user can still obtain information resources from the proxy cache even if the remote server cannot provide services within a certain period of time. This can obviously improve the quality of service of the client.

However, the storage capacity of the proxy cache is limited. Once the storage area is full, some obsolete data is replaced according to a pre-agreed policy to serve the user subsequently. The replacement policy directly affects the performance of the proxy cache. Therefore, the cache replacement policy is an important factor affecting the performance of the proxy cache.

Generally, the performance indicators for measuring a cache replacement policy include a cache hit rate (CHR) (also called hit rate), a byte hit rate (BHR), and a latency time (LT). The CHR is a ratio of the count of hit cache pages to the total number of user requests. The BHR is a ratio of the number of hit bytes in the cache to the total number of bytes requested by the user. The LT refers to the interval from the time when the user initiates an access request to the time when the user receives a response to the request.

Currently, a general cache replacement policy includes a Least Frequently Used (LFU) algorithm, a Greedy Dual Size (GDS) algorithm, a Least Frequently Recently Used (LFRU) algorithm, a Period Least Frequently Used (PLFU) algorithm, and a Least Served Bytes (LSB) algorithm. The performance of the cache replacement policy depends on multiple factors, for example, the user access model, application features of the user access, and cache size. Currently, a cache replacement policy that covers all factors and is superior to other algorithms is not available. In addition, these algorithms do not have adaptability in the case of application changes. For example, for the conventional Web access, the GDS algorithm has better performance; for the VOD application, the LFRU algorithm and the PLFU algorithm have higher efficiency than the conventional LFU algorithm and are more applicable to a large-scale VOD system; the LSB algorithm is more suitable for the peer-to-peer (P2P) download application.

With constant changes of network applications, new requirements are raised for the adaptability of the cache replacement policy. Take the Squid Cache as an example to describe a typical solution in the prior art. The Squid Cache (briefly referred to as the Squid) is a popular open source proxy server and Web cache server, and works by using configuration files. The following is the text of some configuration files of the Squid Cache and includes configuration of the cache replacement policy.

```
......
cache_mem 1228 MB
maximum_object_size 5096 KB
maximum_object_size_in_memory 5096 KB
cache_replacement_policy heap LFUDA
memory_replacement_policy heap LRU
cache_dir aufs /cache 27970 16 256
cache_access_log /log/access.log
cache_log /log/cache.log
......
```

The configuration of cache replacement policy is executed by using the following two lines:

```
cache_replacement_policy heap LFUDA
memory_replacement_policy heap LRU
```

In the above two lines, the first line is to configure the cache replacement policy of the entire Squid Cache as the LFUDA algorithm, and the second line is to configure the cache replacement policy of the memory as LRU algorithm.

That is, the Squid determines a cache replacement policy through pre-configuration. Once the Squid Cache runs, the cache replacement policy cannot be changed; if the cache replacement policy is changed, the Squid Cache must be restarted to validate the new configuration. The Squid Cache has the following disadvantages: The selection and update of the cache replacement policy require manual intervention. The cache replacement policy is determined, selected, and updated by an administrator. That is, to select a specific algorithm, the administrator must clearly know various factors such as the current user access model and application and also know which cache replacement policy is suitable for the current scenario. This imposes too high requirements on the administrator. When the scenario is changed, for example, when the user access mode is changed or the application is changed, the Squid Cache cannot adapt to the change properly.

SUMMARY OF THE INVENTION

Embodiments of the present invention provide a method, an apparatus, and a proxy server for selecting cache replacement policies to reduce manual participation and switch cache replacement policies automatically.

An embodiment of the present invention provides a method for selecting cache replacement policies, the method includes:

obtaining statistical data of multiple policies that are running simultaneously; and switching, according to an event of policy decision for cache replacement policies and the statistical data, an active cache replacement policy to a cache replacement policy that complies with a policy decision requirement.

Another embodiment of the present invention provides an apparatus for selecting cache replacement policies, the apparatus includes:

an obtaining module, configured to obtain statistical data of multiple cache replacement policies that are running simultaneously; and a switching module, configured to switch, according to an event of policy decision for cache replacement policies and the statistical data obtained by the obtaining module, an active cache replacement policy to a cache replacement policy that complies with a policy decision requirement.

A proxy server provided by embodiments of the present invention includes multiple cache replacement policy modules and the preceding apparatus for selecting cache replacement policies.

A system provided by embodiments of the present invention includes a proxy server and the preceding apparatus for selecting cache replacement policies.

As seen from the embodiments of the present invention, after the statistical data of multiple cache replacement policies is obtained, cache replacement policies are selected according to the policy decision for cache replacement policies. Therefore, the automatic switching of cache replacement policies lowers the technical requirements on administrators. In addition, in the running process of the proxy cache, a cache replacement policy that is applicable to the current scenario and meets the performance expectation of the user can be selected automatically, so as to make the technical solution feature good adaptability. Compared with the existing technical solution in which only a cache replacement policy is used throughout, the technical solution of the present invention can improve the performance of the proxy cache.

BRIEF DESCRIPTION OF THE DRAWINGS

To make the technical solution of the present invention clearer, the accompanying drawings for illustrating the embodiments of the present invention are outlined below. Evidently, the accompanying drawings are exemplary only, and those skilled in the art can derive other drawings from such accompanying drawings without creative efforts.

DETAILED DESCRIPTION OF THE EMBODIMENTS

The technical solution of the present invention is described in detail below with reference to accompanying drawings. Apparently, the embodiments described below are merely part of rather than all of embodiments of the present invention. Those skilled in the art can derive other embodiments from the embodiments given herein without making any creative effort, and all such embodiments are covered in the protection scope of the present invention.

Figure 1:
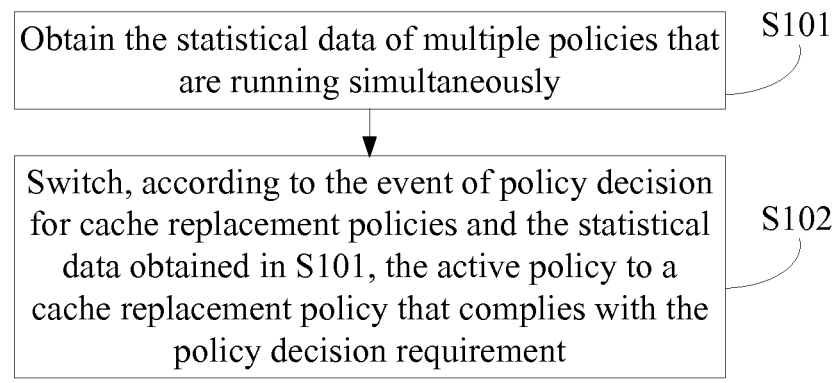
FIG. 1 is a schematic flowchart of a method for selecting cache replacement policies according to an embodiment of the present invention.

FIG. 1 is a schematic flowchart of a method for selecting cache replacement policies according to an embodiment of the present invention. As shown in FIG. 1, the method includes the following steps:

S101. Obtain statistical data of multiple policies that are running simultaneously.

In this embodiment, multiple cache replacement policies may be configured as required, for example, the LRU algorithm, the GDS algorithm, and the LSB algorithm. A scenario that multiple cache replacement policies are running simultaneously refers to that replacement suggestions, statistical data, and replacement policies are provided according to the different algorithms. However, only one cache replacement policy decides whether to delete or reserve the cache data. This cache replacement policy in this embodiment is called an active cache replacement policy, and the rest are called standby cache replacement policy. Multiple cache replacement policies each maintain a flag. It is considered that a cache replacement policy generally switches between the active cache replacement policy and the standby active cache replacement policy, so logic values "1" and "0" may be used to set the flag of the policies in this embodiment. For example, logic value "1" indicates that the cache replacement policy is an active cache replacement policy, and logic value "0" indicates that the cache replacement policy is a standby cache replacement policy; vise versa. Or, more specifically, "active" is directly used to indicate that the cache replacement policy is an active cache replacement policy, and "standby" is used to indicate that the cache replacement policy is a standby cache replacement policy.

It is understandable to those skilled in the art that the definitions of the flags of the cache replacement policies are only exemplary and are not intended to limit the protection scope of the present invention.

In this embodiment, either the active cache replacement policy or the standby cache replacement policy should collect its own statistical data, for example, the CHR, the BHR, or the LT.

The statistical data of the cache replacement policies (including the active cache replacement policy and the standby cache replacement policy) may be actively reported to an entity that executes the method for selecting cache replacement policies. In this way, the statistical data of multiple cache replacement policies that are running simultaneously is obtained. The entity that executes the method for selecting cache replacement policies may be an apparatus for selecting cache replacement policies. The apparatus may be configured on the proxy cache (the proxy server) or on other network devices such as a network management system. Functional modules/units of the apparatus may be software modules/units, hardware modules/units or any combination of software and hardware modules/units. The apparatus includes an obtaining module and a switching module. The obtaining module is configured to obtain the statistical data of multiple cache replacement policies that are running simultaneously. The switching module is configured to switch, according to an event of policy decision for cache replacement policies and the statistical data obtained by the obtaining module, the active cache replacement policy to a cache replacement policy that complies with the policy decision requirement. Alternatively, after the entity that executes the method for selecting cache replacement policies sends a request for statistical data, multiple cache replacement policies each report its own statistical data passively. In this way, the entity that executes the method for selecting cache replacement policies obtains such statistical data. If the apparatus is configured on the proxy cache (the proxy server), the obtaining module may obtain the statistical data via an internal interface. If the apparatus is configured on other network devices such as the network management system, the obtaining module may obtain the statistical data over some network protocols, for example, the Simple Network Management Protocol (SNMP). Certainly, the obtaining module may obtain the statistical data in other modes, and details are omitted.

S102. Switch, according to the event of policy decision for cache replacement policies and the statistical data obtained in S101, the active cache replacement policy to a cache replacement policy that complies with the policy decision requirement.

The statistical data of multiple cache replacement policies that are running simultaneously may be obtained. After the event of policy decision occurs, the active cache replacement policy is switched, according to the policy decision for cache replacement policies and the statistical data, to a cache replacement policy that complies with the policy decision requirement. In this embodiment, the policy decision for cache replacement policies includes the occurrence of the event of policy decision and the policy decision requirement.

The event of policy decision indicates when to switch the replacement policy, for example, it may be a time point that a network administrator sets according to the requirement or a periodic time point, such as the 15$^{th}$ day each month or every Friday. When these time points arrive, the active cache replacement policy is switched to a cache replacement policy that complies with the policy decision requirement.

The event of policy decision may also be that the hit rate of the active cache replacement policy is smaller than a set value. Once the event occurs, the active cache replacement policy is switched to another active cache replacement policy whose hit rate is higher than the set value.

The policy decision requirement refers to conditions for selecting the active cache replacement policy, for example, a replacement policy whose hit rate is the highest, whose hit rate grows the fastest, or whose LT is smaller than a set value (for example, 100 ms).

For example, the statistical data (such as the hit rate) of multiple cache replacement policies at a time point (such as August 15) last month (such as August) may be obtained. If the hit rate of a cache replacement policy is the highest on August 15, at a time point corresponding to August 15, for example, September 15, the active cache replacement policy is switched to the cache replacement policy with the highest hit rate.

It should be noted that the preceding events of policy decision may also be combined in any mode. When any combination of events of policy decision occurs, the active cache replacement policy is switched to a cache replacement policy that complies with the policy decision requirement. For example, every Friday, when the hit rate of the running active cache replacement policy is smaller than the set value, the active cache replacement policy may be switched to a cache replacement policy that complies with the policy decision requirement.

Certainly, the preceding policy decision requirements may also be combined in any mode. When an event of policy decision occurs, the active cache replacement policy is switched to a cache replacement policy that complies with any combination of policy decision requirements. For example, every Friday, the active cache replacement policy may be switched to a cache replacement policy whose hit rate is the highest, whose hit rate grows the fastest, or whose LT is smaller than a set value.

The switching module judges whether an event of policy decision occurs; if an event of policy decision occurs, the switching module selects, according to the statistical data of the cache replacement policy, a cache replacement policy that complies with the policy decision requirement. For example, the flag of the cache replacement policy is set as "active" and the flag of the original active cache replacement policy is set as "standby". Certainly, the original active cache replacement policy may also be selected. In this case, the switching operation is not performed.

It should be noted that the preceding events of policy decision, policy decision requirements, and any combination of the events of policy decision and policy decision requirements are merely exemplary, and should not be construed as limitations on the present invention.

As seen from the preceding embodiment of the present invention, after the statistical data of multiple cache replacement policies is obtained, cache replacement policies are selected according to the policy decision for cache replacement policies. Therefore, the automatic switching of cache replacement policies lowers the technical requirements on administrators. In addition, in the running process of the proxy cache, a cache replacement policy that is applicable to the current scenario and meets the performance expectation of the user can be selected automatically, so as to make the technical solution feature good adaptability. Compared with the existing solution in which only a cache replacement policy is used throughout, the technical solution of the present invention can improve the performance of the proxy cache.

Figure 2:
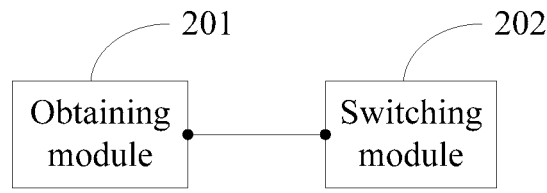
FIG. 2 is a schematic logical structure diagram of an apparatus for selecting cache replacement policies according to an embodiment of the present invention.

FIG. 2 is a schematic logical structure diagram of an apparatus for selecting cache replacement policies according to an embodiment of the present invention. For better description, only the modules related to the embodiment of the present invention are illustrated. The apparatus may be configured on the proxy cache (the proxy server). Functional modules/units of the apparatus may be software modules/units, hardware modules/units or any combination of software and hardware modules/units. As shown in FIG. 2, the apparatus for selecting cache replacement policies includes an obtaining module 201 and a switching module 202.

The obtaining module 201 is configured to obtain statistical data of multiple cache replacement policies that are running simultaneously.

The switching module 202 is configured to switch, according to an event of policy decision for cache replacement policies and the statistical data obtained by the obtaining module 201, the active cache replacement policy to a cache replacement policy that complies with a policy decision requirement.

In this embodiment, the event of policy decision indicates when to switch the replacement policy, for example, it may be a time point that a network administrator sets according to the requirement or a periodic time point, such as the 15$^{th}$ day each month or every Friday. When these time points arrive, the active cache replacement policy is switched to a cache replacement policy that complies with the policy decision requirement.

The event of policy decision may also be that the hit rate of the active cache replacement policy is smaller than a set value. Once the event occurs, the active cache replacement policy is switched to another active cache replacement policy whose hit rate is higher than the set value.

The policy decision requirement refers to conditions for selecting the active cache replacement policy. For example, the policy decision requirement may be: compared with other cache replacement policies, a cache replacement policy should have the highest hit rate, a hit rate that grows the fastest, or an LT smaller than a set value (for example, 100 ms).

For example, the obtaining module 201 may obtain statistical data (for example, the hit rate) of multiple cache replacement policies at a time point (for example, August 15) last month (for example, August). If the hit rate of a cache replacement policy is the highest on August 15, at a time point corresponding to August 15, for example, September 15, the switching module 202 switches the active cache replacement policy to the cache replacement policy with the highest hit rate.

It should be noted that the preceding events of policy decision may also be combined in any mode. When any combination of events of policy decision occurs, the active cache replacement policy is switched to a cache replacement policy that complies with the policy decision requirement. For example, every Friday, when the hit rate of the running active cache replacement policy is smaller than the set value, the active cache replacement policy may be switched to a cache replacement policy that complies with the policy decision requirement.

Certainly, the preceding policy decision requirements may also be combined in any mode. When an event of policy decision occurs, the switching module 202 switches the active cache replacement policy to a cache replacement policy that complies with any combination of policy decision requirements. For example, every Friday, the switching module 202 switches the active cache replacement policy to a cache replacement policy whose hit rate is the highest, whose hit rate grows the fastest, or whose LT is smaller than a set value.

In embodiments of the present invention, after the statistical data of multiple cache replacement policies is obtained, cache replacement policies are selected according to the policy decision for cache replacement policies. Therefore, the automatic switching of cache replacement policies lowers the technical requirements on administrators. In addition, in the running process of the proxy cache, a cache replacement policy that is applicable to the current scenario and meets the performance expectation of the user can be selected automatically, so as to make the technical solution feature good adaptability. Compared with the existing solution in which only a cache replacement policy is used throughout, the technical solution of the present invention can improve the performance of the proxy cache.

Figure 3:
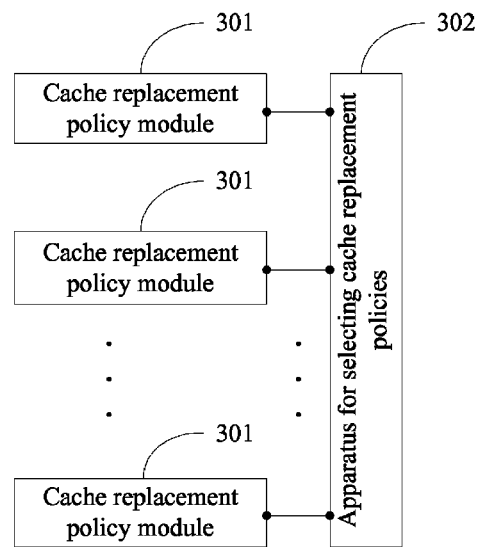
FIG. 3 is a schematic logical structure diagram of a proxy server according to an embodiment of the present invention.

FIG. 3 is a schematic logical structure diagram of a proxy server according to an embodiment of the present invention. For better description, only the modules related to the embodiment of the present invention are illustrated. The proxy server includes an apparatus 302 for selecting cache replacement policies and a cache replacement policy module 301. The apparatus 302 for selecting cache replacement policies may be the apparatus for selecting cache replacement policies shown in FIG. 2. In this embodiment, multiple cache replacement policy modules 301 may be available on the proxy server; however, only one cache replacement policy module runs the active cache replacement policy and the rest run standby cache replacement policies. The definitions of the active cache replacement policy and the standby cache replacement policy are the same as those shown in FIG. 1 or FIG. 2, and are not further described. For details, refer to related descriptions in the preceding embodiments of the present invention.

Figure 4:
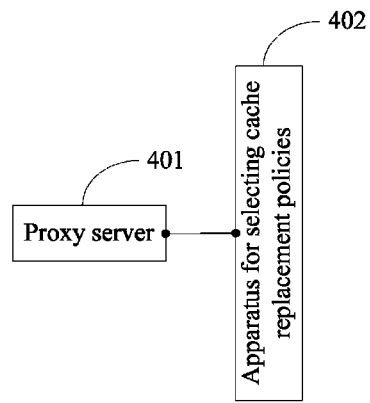
FIG. 4 illustrates a system according to an embodiment of the present invention.

The apparatus for selecting cache replacement policies shown in FIG. 2 may also be applied in some communication systems, and not merely applied in the proxy server. As shown in FIG. 4, the system provided in an embodiment of the present invention includes a proxy server 401 and the apparatus 402 for selecting cache replacement policies shown in FIG. 2. The proxy server 401 includes multiple cache replacement policy modules; however, only one cache replacement policy module runs the active cache replacement policy, and the rest run standby cache replacement policies. The definitions of the active cache replacement policy and the standby cache replacement policy are the same as those shown in FIG. 1 or FIG. 2, and are not further described.

It should be noted that information interaction and execution processes between the modules/units of the apparatus are based on the same concept of the method provided in embodiments of the present invention and thus achieve the same technical effect as the method. For details, refer to the method embodiments of the present invention.

It is understandable to those skilled in the art that all or part of steps of the methods in embodiments of the present invention may be completed by related hardware instructed by a program. The program may be stored in a computer readable storage medium. The storage medium may include a Read Only Memory (ROM), a Random Access Memory (RAM), a Magnetic Disk, or a Compact Disk-Read Only Memory (CD-ROM).

A method, an apparatus, and a proxy server for selecting cache replacement policies provided in embodiments of the present invention are described in detail. Although the principle of the invention is described through some exemplary embodiments, these embodiments are only intended to help understand the method and the core idea of the present invention. It is apparent that those skilled in the art can make various modifications and variations to the invention without departing from the spirit and scope of the invention. The content of the specification of the present invention should not be intended to limit the protection scope of the present invention.

What is claimed is:

1. A method for selecting cache replacement policies, comprising:

obtaining statistical data of multiple cache replacement policies that are running simultaneously; wherein among the multiple cache replacement policies only one active cache replacement policy decides whether to delete or reserve cache data; and switching, according to an event of policy decision for cache replacement policies and the statistical data, from the active cache replacement policy to a cache replacement policy that complies with a policy decision requirement;

wherein the step of switching from the active cache replacement policy to the cache replacement policy that complies with the policy decision requirement comprises:

setting a flag of the cache replacement policy that complies with the policy decision requirement to active and setting a flag of the original active cache replacement policy to standby, wherein the "active" flag indicates that the cache replacement policy whose flag is set as active is an active cache replacement policy and the "standby" flag indicates that the cache replacement policy whose flag is set as standby is a standby cache replacement policy.

2. The method according to claim 1, wherein among the multiple cache replacement policies that are running simultaneously, only one cache replacement policy is an active cache replacement policy and the remaining cache replacement policies are standby cache replacement policies.

3. The method according claim 1, wherein the statistical data comprises at least one of a hit rate, a byte hit rate, and a latency time.

4. An apparatus implemented by hardware for selecting cache replacement policies, comprising:

an obtaining module, configured to obtain statistical data of multiple cache replacement policies that are running simultaneously; wherein among the multiple cache replacement policies only one active cache replacement policy decides whether to delete or reserve cache data; and a switching module, configured to switch, according to an event of policy decision for cache replacement policies and the statistical data obtained by the obtaining module, from the active cache replacement policy to a cache replacement policy that complies with a policy decision requirement;

wherein the switching module is configured to set a flag of the cache replacement policy that complies with the policy decision requirement to active and set a flag of the original active cache replacement policy to standby, wherein the "active" flag indicates that the cache replacement policy whose flag is set as active is an active cache replacement policy and the "standby" flag indicates that the cache replacement policy whose flag is set as standby is a standby cache replacement policy.

5. The apparatus according to claim 4, wherein the apparatus further comprises multiple cache replacement policy modules configured to run different cache replacement policies.

6. The apparatus according to claim 5, wherein among the multiple cache replacement policy modules, only one cache replacement policy module runs an active cache replacement policy and the remaining cache replacement policy modules run standby cache replacement policies.

7. A system, comprising an apparatus for selecting cache replacement policies and a proxy server, wherein the apparatus is configured to obtain statistical data of multiple cache replacement policies that are running simultaneously from the proxy server, wherein among the multiple cache replacement policies only one active cache replacement policy decides whether to delete or reserve cache data; and switches, according to an event of policy decision for cache replacement policies and the obtained statistical data, from the active cache replacement policy to a cache replacement policy that complies with a policy decision requirement;

wherein the apparatus is further configured to set a flag of the cache replacement policy that complies with the policy decision requirement to active and set a flag of the original active cache replacement policy to standby, wherein the "active" flag indicates that the cache replacement policy whose flag is set as active is an active cache replacement policy and the "standby" flag indicates that the cache replacement policy whose flag is set as standby is a standby cache replacement policy.

8. The system according to claim 7, wherein the proxy server comprises multiple cache replacement policy modules, wherein only one cache replacement policy module runs an active cache replacement policy and the remaining cache replacement policy modules run standby cache replacement policies.

* * * * *